(12) United States Patent
Viswambharan et al.

(10) Patent No.: US 11,824,674 B2
(45) Date of Patent: Nov. 21, 2023

(54) APPLICATION SPECIFIC NETWORK SLICES

(71) Applicant: Cisco Technology, Inc., San Jose, CA (US)

(72) Inventors: Rajesh Indira Viswambharan, Karnataka (IN); Ram Mohan Ravindranath, Karnataka (IN); Faisal Siyavudeen, Kerala (IN); Vinay Saini, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/509,918

(22) Filed: Oct. 25, 2021

(65) Prior Publication Data

US 2023/0132233 A1    Apr. 27, 2023

(51) Int. Cl.
*H04L 12/18*     (2006.01)
*H04W 28/20*     (2009.01)

(52) U.S. Cl.
CPC .......... *H04L 12/189* (2013.01); *H04L 12/185* (2013.01); *H04L 12/1813* (2013.01); *H04W 28/20* (2013.01)

(58) Field of Classification Search
CPC .. H04W 28/20; H04L 12/189; H04L 12/1813; H04L 12/185
See application file for complete search history.

(56) References Cited

U.S. PATENT DOCUMENTS

| | | | |
|---|---|---|---|
| 10,820,366 B2 * | 10/2020 | Jeon | H04L 5/0044 |
| 10,880,895 B2 * | 12/2020 | Gordaychik | H04L 1/1896 |
| 2017/0054595 A1 | 2/2017 | Zhang et al. | |
| 2018/0132138 A1 * | 5/2018 | Senarath | H04L 41/0813 |
| 2019/0158364 A1 * | 5/2019 | Zhang | H04L 41/5054 |
| 2019/0223055 A1 * | 7/2019 | Bor Yaliniz | H04W 48/16 |
| 2020/0045548 A1 | 2/2020 | Dowlatkhah et al. | |
| 2020/0260338 A1 | 8/2020 | Dowlatkhah et al. | |
| 2021/0243684 A1 | 8/2021 | Wang et al. | |
| 2021/0288918 A1 * | 9/2021 | Sciancalepore | G06Q 10/00 |
| 2022/0007180 A1 * | 1/2022 | Liao | H04W 12/06 |
| 2022/0060858 A1 * | 2/2022 | Manithara Vamanan | H04W 76/14 |

* cited by examiner

*Primary Examiner* — Kristie D Shingles
(74) *Attorney, Agent, or Firm* — Polsinelli

(57) ABSTRACT

Disclosed are systems, apparatuses, methods, and computer-readable media for participating in a meeting through an application provider using application-specific network slices. A method includes transmitting a request to a mobile network operator (MNO) for setup of a data connection with a device for a meeting provided by an application provider; receiving allowed network slices for the data connection that are generated by the MNO for the meeting; identifying a network slice from the allowed network slices for the meeting based on one or more characteristics specific to the meeting; and establishing the data connection with the mobile network operator based on the network slice.

18 Claims, 11 Drawing Sheets

APPLICATION SPECIFIC NETWORK SLICES

TECHNICAL FIELD

The present technology pertains to application network slices in wireless communication infrastructure to ensure that wireless devices can setup a data connection based on application specific information and relevant information to ensure a suitable level of service.

DESCRIPTION OF THE RELATED TECHNOLOGY

Fifth generation (5G) mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with an Access and Mobility Management Function (AMF)/Mobility Management Entity (MME) for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of provisioning specific services, e.g. based on requirements of the services, to the enterprise.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
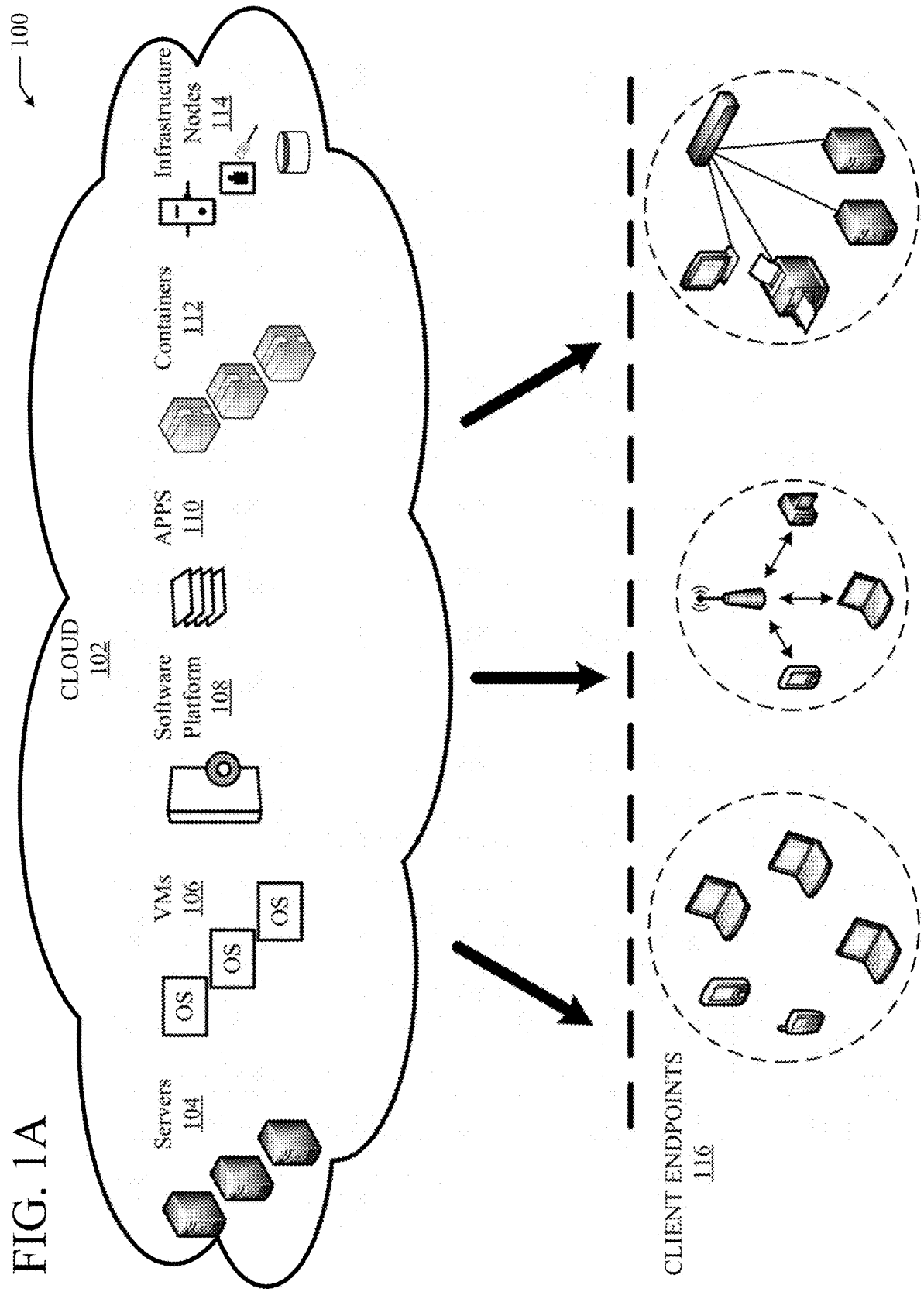
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The disclosed technology addresses the challenges to network allocation for applications by creating logical networks based on the underlying requirements of the application. Various entities (e.g., enterprise customers) can negotiate with the service providers and create a network slice based on instances of an application. In some examples, the disclosed technology can be implemented by online meeting applications and allow different network slices be provided to users based on the user's role and meeting characteristics. The disclosed technology can also be applied to other types of network services such as streaming, gaming, and social media functions.

Systems, methods, and computer-readable media are provided for participating in a meeting through an application provider using application-specific network slices. An example method can include transmitting a request to a mobile network operator (MNO) for setup of a data connection with a device for a meeting provided by an application provider; receiving allowed network slices for the data connection that are generated by the MNO for the meeting; identifying a network slice from the allowed network slices for the meeting based on one or more characteristics specific to the meeting; and establishing the data connection with the mobile network operator based on the network slice.

An example system can include one or more processors and at least one computer-readable storage medium storing instructions which, when executed by the one or more processors, cause the one or more processors to transmit a request to a MNO for setup of a data connection with a device for a meeting provided by an application provider; receive allowed network slices for the data connection that are generated by the MNO for the meeting; identify a network slice from the allowed network slices for the meeting based on one or more characteristics specific to the meeting; and establish the data connection with the mobile network operator based on the network slice.

In some examples, the request includes a role associated with the meeting.

In some examples, the method can include determining network characteristics of the data connection; and determining device characteristics relevant to the meeting, and wherein the network slice for the meeting satisfies requirements based on the network characteristics, the device characteristics, and the role associated with the meeting.

In some examples, the MNO determines the allowed network slices provided to the device based on the role associated with the meeting.

In some examples, the role associated with the meeting is assigned during setup of the meeting or modification of the meeting with the application provider.

In some examples, the method can include transmitting metrics during the meeting associated with a performance of the data connection.

In some examples, the method can include when the meeting is completed, presenting a user interface requesting feedback of the data connection; and transmitting the feedback to the application provider.

In some examples, when the meeting is associated with a group of meetings, the application provider modifies a recurring meeting information based on the metrics and the feedback.

In some examples, the mobile network operator reserves resources for the meeting based on an estimated location of the device.

Example Embodiments

Online meetings have become common for educational, organizational, civic, community, and family events. Many common events that were traditionally in person have shifted to online event for simplicity and safety. However, there can be network-level challenges such as insufficient bandwidth, improper prioritization, and oversubscription of the network resources that degradation of the online meeting experience. For example, a presenter role should have better network treatment because uplink traffic, and so forth.

In addition, the varying parameters of meetings can impose varying demands on the network. The meeting experience can be improved by end-to-end optimization of the network resources in the access layer, the transport layer, and the core layer. Moreover, each participant should have consistent network behavior even connected through different service providers and locations to ensure a high-quality meeting experience.

The disclosed technology addresses the challenges to network allocation for applications by creating logical networks based on the underlying requirements of the application. Various entities (e.g., enterprise customers) can negotiate with the service providers and create a slice for a specific application requirement. Considering the diverse demands of applications, it is not an optimal solution to contain all the requirements in a single slice specific to that application. The disclosed technology extends network slicing by instituting distinct network slices and dynamically recommending an appropriate slice based on network requirements of an application and various roles to improve the user experience.

In some examples, the application provider (e.g., a meeting provider) can provide network slice information that identifies slices to be created based on meeting type (e.g., a conventional presentation that is primarily simplex, a small meeting that is duplex, etc.), meeting capacity, roles of the various devices, and so forth. A mobile network operator (MNO) may receive the network slice information and generate slices in advance of the online meeting. Users can then setup a data connection with the MNO based on the generated slices and relevant information to ensure that users receive a suitable level of service.

Figure 1B:
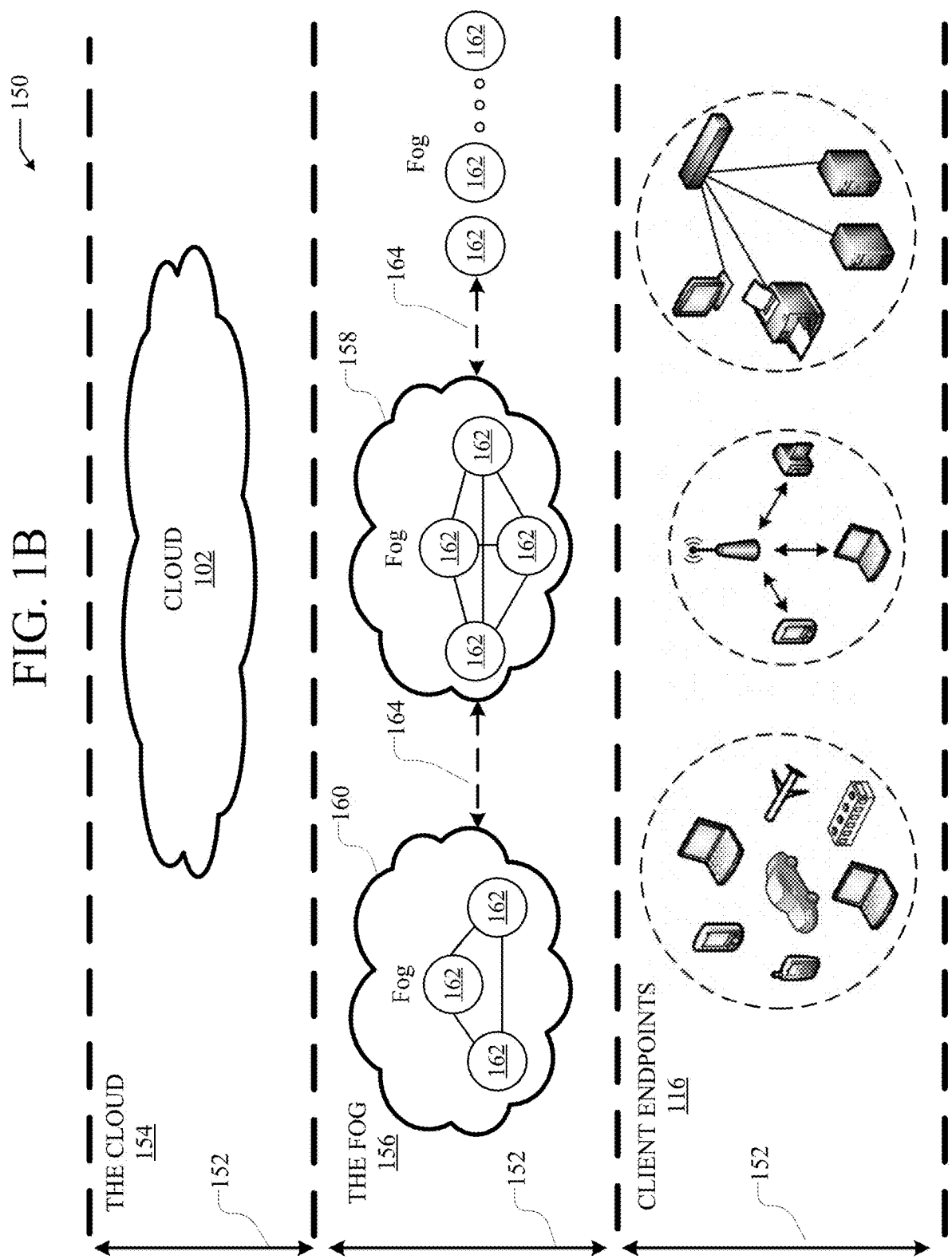
FIG. 1B illustrates an example fog computing architecture
Figure 2:
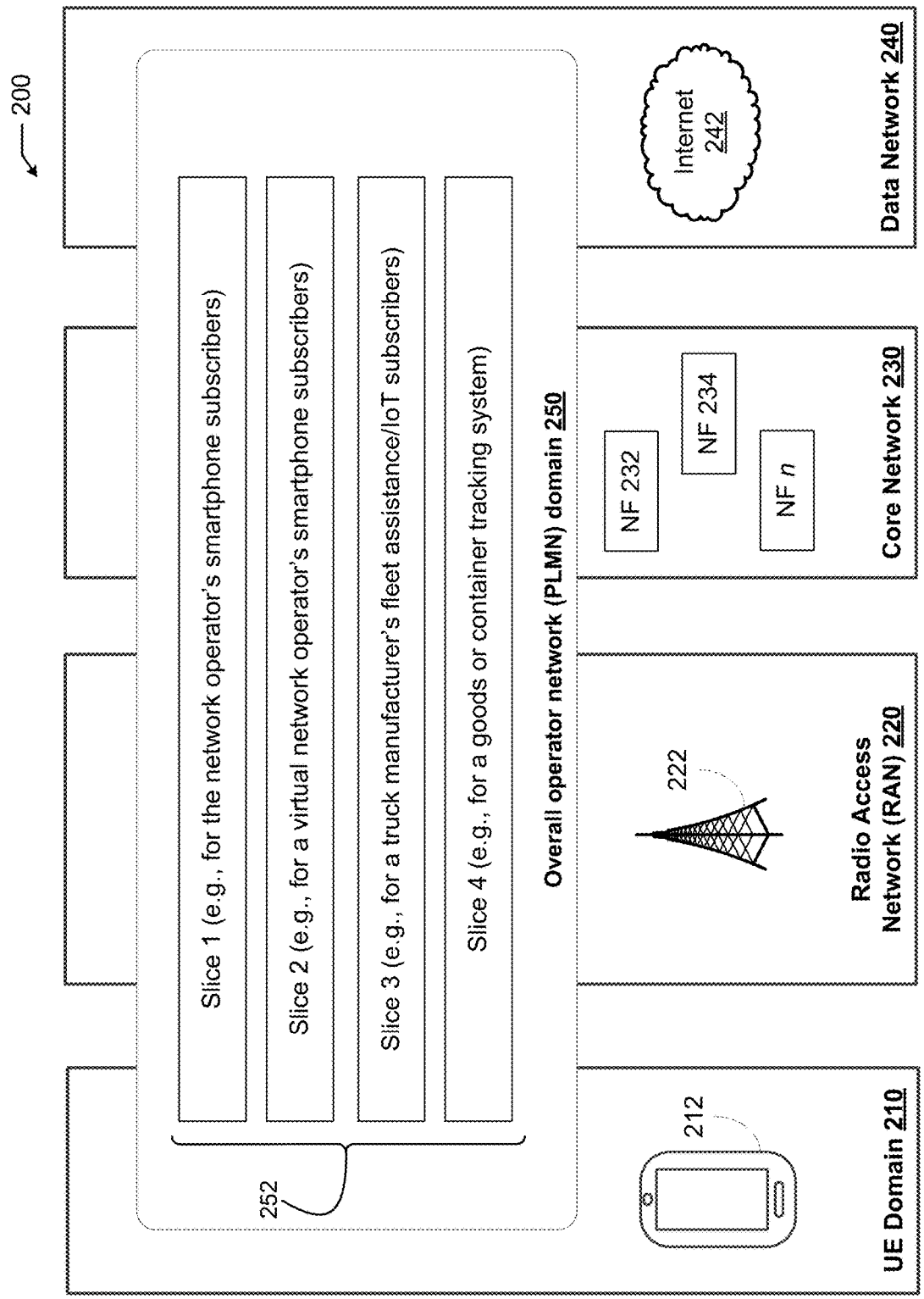
FIG. 2 depicts an exemplary schematic representation of a fifth generation (5G) network environment in which network slicing has been implemented according to an example of the instant disclosure.

A description of network environments and architectures for network data access and services, as illustrated in FIGS. 1 and 2, is first disclosed herein. A discussion of application-specific network slices in FIGS. 3, 4, 5, 6, 7, 8, and 9 will then follow. The discussion then concludes with a brief description of example devices, as illustrated in FIG. 10. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a transport control protocol (TCP) connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a global positioning service (GPS) device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog layers 158, 160. The fog layers 158, 160 can be local or regional clouds or networks. For example, the fog layers 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog layers while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud layer 154 while located at the starting location and switch to a different physical and/or logical connection point with the cloud layer 154 while located at the destination location. The particular fog node can thus move within particular clouds and/or fog instances and, therefore, serve endpoints from different locations at different times.

FIG. 2 depicts an exemplary schematic representation of a fifth generation (5G) network environment 200 in which network slicing has been implemented, and in which one or more aspects of the present disclosure may operate. As illustrated, 5G network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a core network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core network 230 contains a plurality of NFs, shown here as NF 232, NF 234 . . . $NF_n$. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing fourth generation (4G) networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF), which is typically used when core network 230 is a 5GC network and Mobility Management Entity (MME), which is typically used when core network 230 is an EPC network. The AMF and SMF may be collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of UEs, 5G networks incorporate the network slicing concept utilized in previous generation architectures.

Within the scope of the 5G mobile and wireless network architecture, a network slice comprises a set of defined features and functionalities that together form a complete PLMN for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices being used to provision the SaaSs to the enterprise. However, associating SaaSs and SaaS providers with network slices is extremely difficult to achieve without federation across enterprises, network service providers, e.g. 5G service providers, and SaaS providers.

Figure 3:
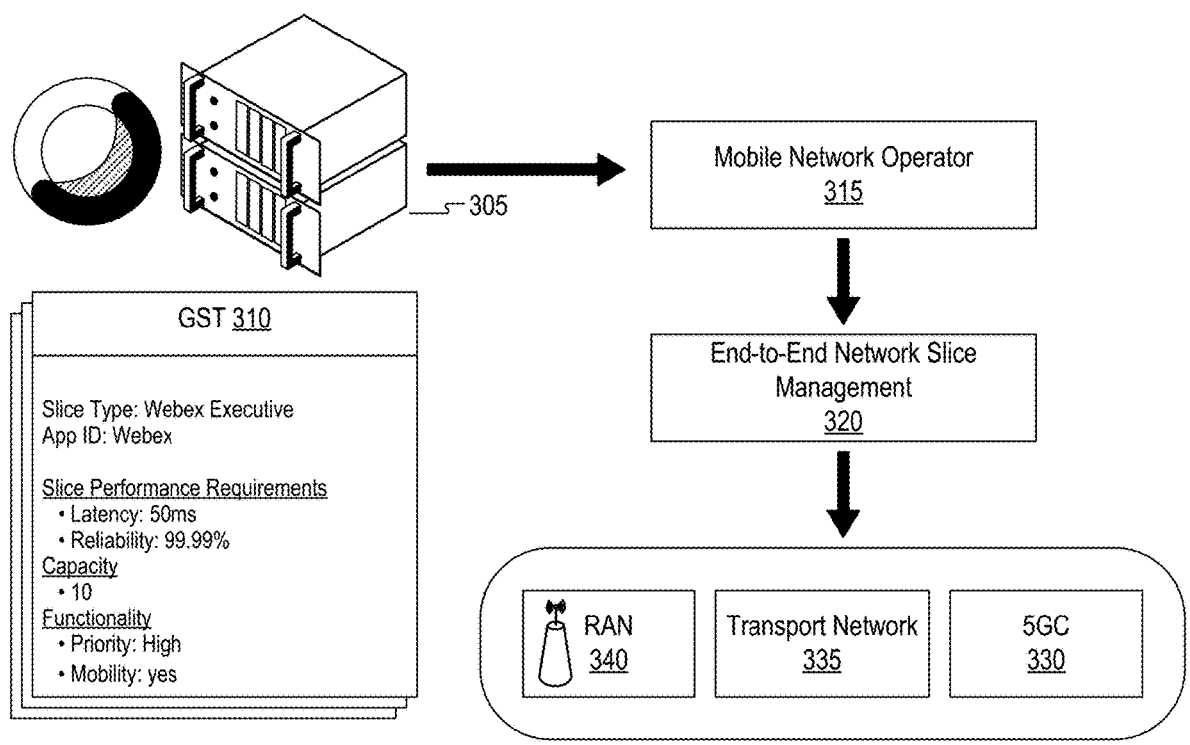
FIG. 3 illustrates a network slice creation process according to an example of the instant disclosure

FIG. 3 illustrates a network slice creation process according to an example of the instant disclosure. In particular, an application provider 305 may provide different types of applications that consume network resources in varying ways. In some examples, the application provider can be an online meeting provider (e.g., Cisco Webex®), a streaming service provider, a gaming service provider, or any other suitable application having dynamic and changing network needs. In some examples, an online meeting can be simplex (e.g., a presentation by a large enterprise regarding product launches), duplex (e.g., a family videoconference), or mixed (e.g., a moderated panel with many observers).

In some examples, users may setup a future instance of the application that includes a plurality of characteristics associated with the instance. For example, a user may request creation of an online meeting with at least one other user through the application provider 305. The user may be using use an application (e.g., a web browser, a natively executable application that includes machine instructions, etc.) to setup a meeting via the application provider 305 that identifies participants, capacity, and various other parameters described below. In some cases, the application provider may be a streaming service and a dedicated streamer may provide an anticipated schedule for streaming. In another case, the application provider may be an online streaming platform for different performances (e.g., live music, theatre, etc.).

The application provider 305 may create a generic service template (GST) 310 that provides application-specific information related to an instance of the application (e.g., a meeting). In the example illustrated in FIG. 3, the GST 310 includes a slice type, an application identifier (ID), slice performance requirements, a capacity, and provide functional information. In some examples, the slice performance requirements can include multiple variants based on a role (e.g., a presenter, an attendee, a witness for a deposition, etc.) that have different network performance requirements. Functionality information can include any information for the network (e.g., whether mobility is required, etc.), information related to the application (e.g., a list of inputs that some or all users may be able to provide through the network connection, etc.), fallback information when particular features cannot be provided, etc.), information associated with other application instances, and so forth.

The application provider 305 may provide the GST 310 to an MNO 315 to cause the mobile network operator to perform end-to-end slice management 320 to generate the different network slices from the GST 310. In some examples, the GST is converted into network slice templates (NST) that are specific to that MNO 315. The NSTs are stored in a suitable element of the MNO such as the AMF.

A UE may then trigger a network instantiation process, and the MNO selects and provide the network slices to relevant network elements such as the 5GC 330, the transport network 335 of the MNO, and at least one RAN 340. A more detailed explanation of the network instantiation process is described herein with reference to FIG. 6.

Figure 4:
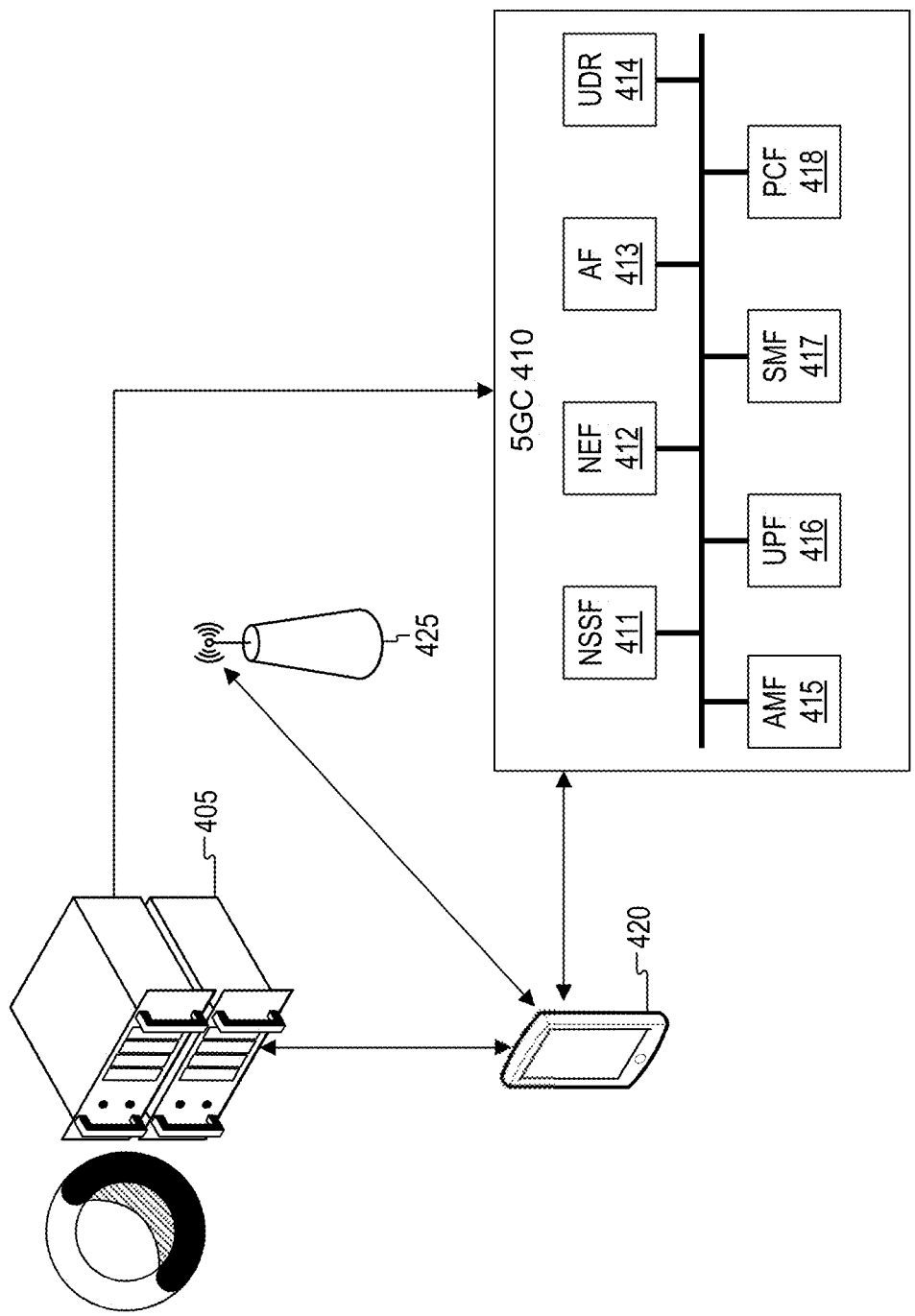
FIG. 4 illustrates a network slice recommendation process according to an example of the instant disclosure.

FIG. 4 illustrates a network slice recommendation process according to an example of the instant disclosure. In some examples, an application provided by the application provider 405 may provide the network slices information to a 5GC 410 as described herein with reference to FIG. 3. The 5GC 410 includes an NSSF 411, an NEF 412, an AF 413, a user data repository (UDR) 414, an AMF 415, and UPF 416, an SMF 417, and a PCF 418

The application may provide slice information to a UE 420 in advance of the instance of the application to allow the UE 420 to select the suitable slice. For example, in the example that the application provider 405 is a meeting application such as Cisco Webex®, the application provider 405 may provide the UE 420 slice information or meeting information associated with that particular meeting.

When the UE 420 initiates a data connection setup with a next generation node B (gNB) 425, the UE 420 includes slice information or meeting information and the gNB 425 identifies the AMF 415 that stores the suitable network slices. The UE 420 obtains allowed network slices from the network slices that are associated with the application instance (e.g., meeting) that the UE 420 is connecting to. The application executing on the UE 420 receives the allowed network slices and determines the suitable network slice to use for the connection. In some examples, the UE 420 receives network slices that are suitable for the participating role in the application instance and determines the best network slice based on device characteristics, meeting information, and other relevant information.

In some cases, the UE 420 may determine the status of different sensors and determine how the user is participating in the application instance. In one example, a user may disable their camera and may only be participating aurally (e.g., voice only connection). In that case, the network slice may not consume less bandwidth. In other cases, the user may be presenting, and a higher latency is required to ensure fewer audio dropouts that can disrupt other user's experience.

Figure 5:
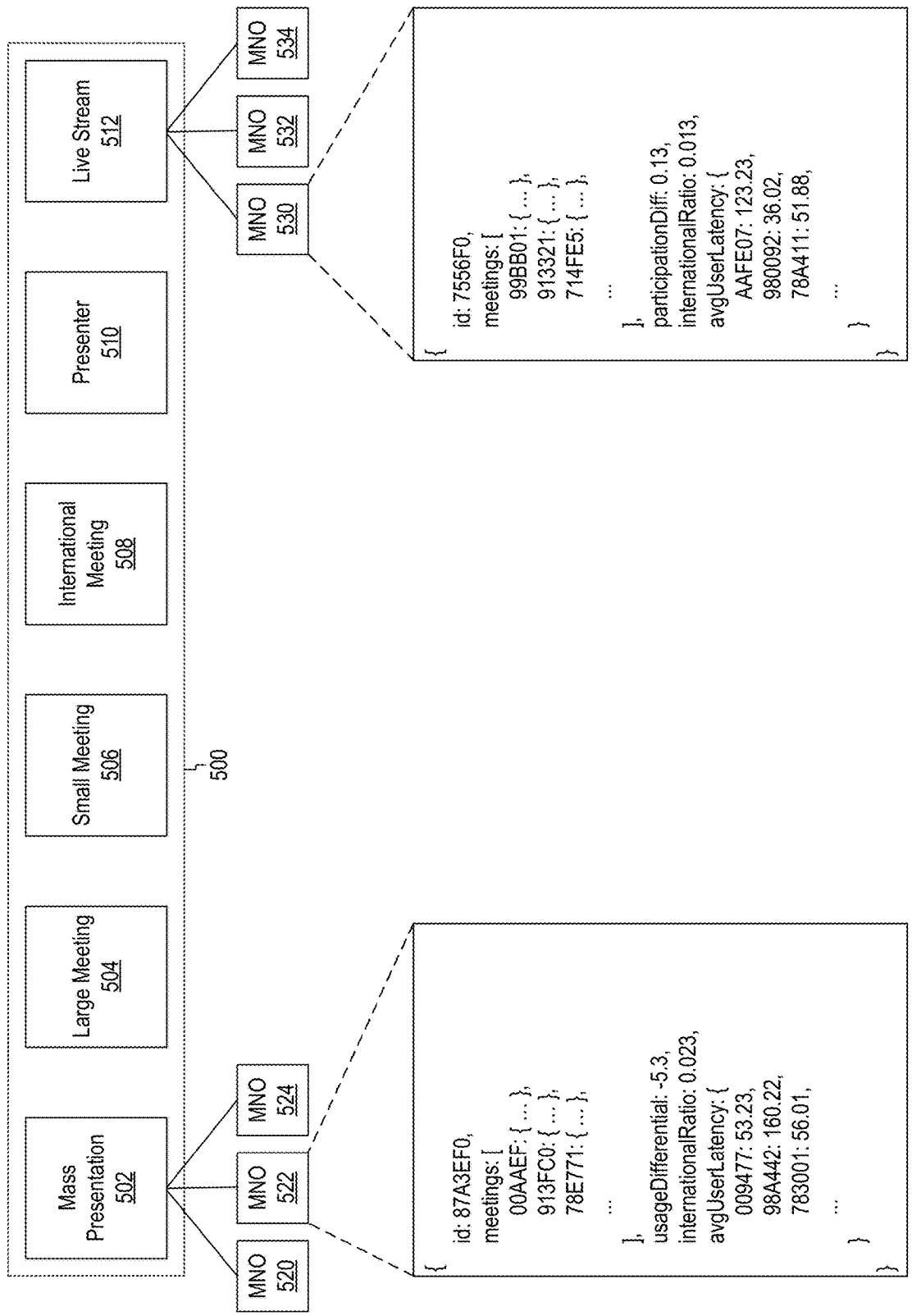
FIG. 5 illustrates data stored by the application provider to generate generic slice templates (GSTs) according to an example of the instant disclosure.

FIG. 5 illustrates data stored by the application provider to generate GSTs according to an example of the instant disclosure. The application provider may receive feedback and metrics to analyze that information to further suggest changes to network information provided in the GSTs. In some examples, the application provider may store data 500 that is separated into different categories such as a mass presentation information 502 (e.g., hundreds or thousands of participants), a large meeting information 504 (e.g., several participants), a small meeting information 506 (e.g., a couple participants), an international meeting information 508, a presenter information 510, and a live stream information 512.

Each type of information stored by the application provider may include a subset of data dedicated to different MNOs and different UEs associated with different MNOs. In some examples, the mass presentation information 502 may include data related to application performance for MNO 520, MNO 522, and MNO 524. The data may be stored in any suitable arrangement such as a relational database or a document database. In particular, the MNO 522 is illustrated in javascript object notation (JSON) and includes data related to meetings (e.g., application instances), usage information, international usage information, average latency associated with users of the MNO 522, etc.). Using this information, the application provider can provide different GSTs to different MNOs to ensure that each user has a high-quality experience. For instance, MNOs are equal and have different performances and the application provider can adjust each GST based on the MNO to ensure that all users have a similar user experience.

Figure 6:
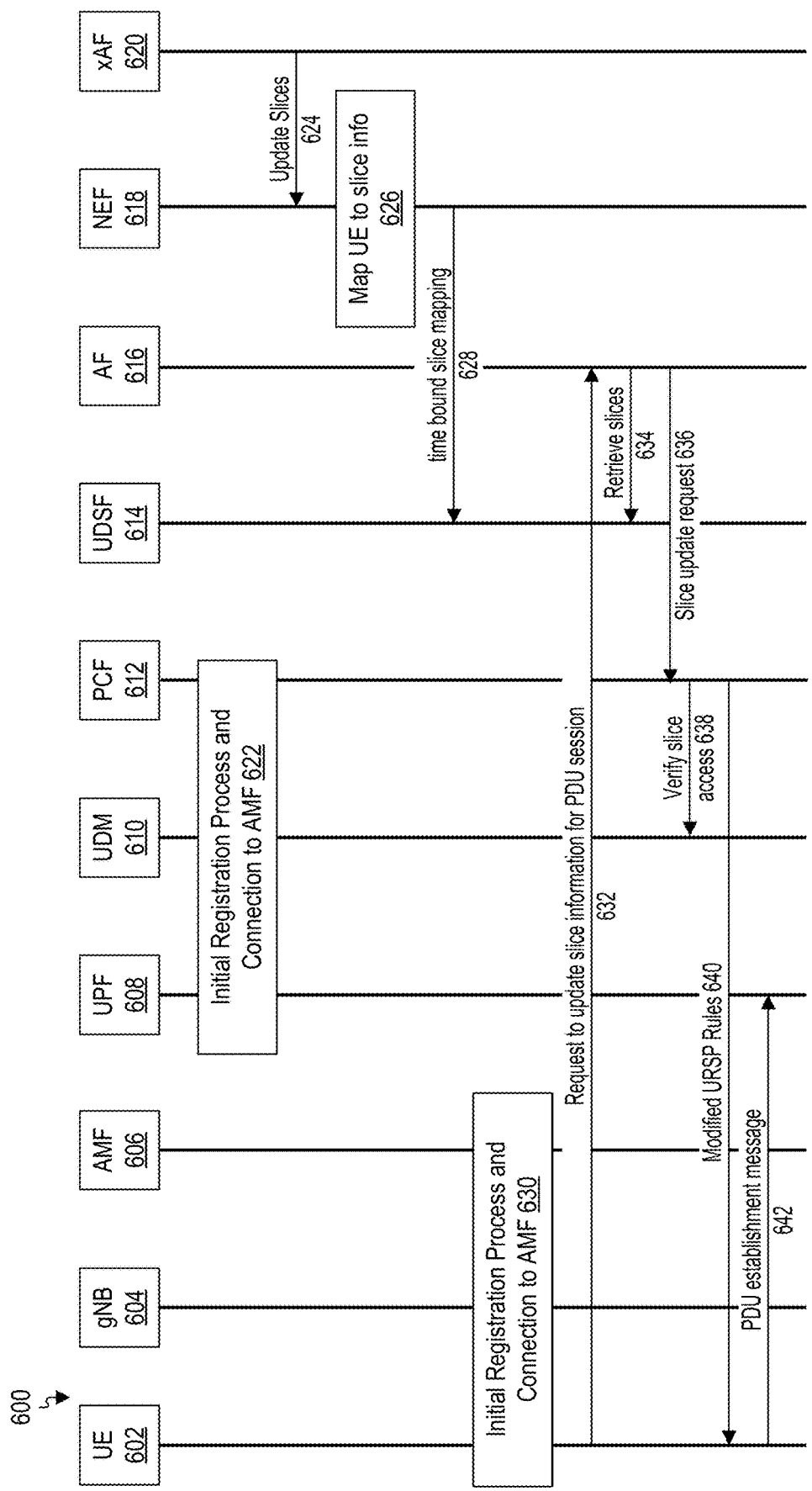
FIG. 6 illustrates a sequence diagram of a method for forming a data connection with an application-specific network slice according to an example of the instant disclosure.

FIG. 6 illustrates a sequence diagram of a method for forming a data connection with an application-specific network slice according to an example of the instant disclosure. Specifically, the system 600 for implementing an application-specific network slice includes a UE 602, a gNB 604, an AMF 606, a UPF 608, a UDM 610, a PCF 612, an unstructured data storage function (UDSF) 614, an AF 616, an NEF 618, and an external application function (xAF) 620 such as Cisco Webex®.

Initially, at block 622, the UDM 610 has the subscription info of UE 602. This contains all subscribed slices and association with the applications. The xAF 620 periodically (relatively longer duration) an update slice message 624 to the 5G system through NEF with the UE to slices to be used for the application (e.g., WebEx). The update slice message 624 will include consolidated info of various meetings that are scheduled through the xAF 620.

In some examples, the NEF 618 processes the incoming request and captures the mapping of an application instance to slice at block 626. In some examples, the NEF 618 maps the UE to slices identified in the update slice message 624 as described above to create the NST for the instance of the application. In some examples, if there are multiple instances of an application, then each instance may include an associated slice. The NEF 618 takes the time and duration of the meeting and accordingly creates the time bound slice information (e.g., time and slice identities) for the UE 602.

The NEF 618 sends the time bound slice information 628 to the UDSF 614. In some examples, the UDSF 614 is a data store and can be used by any function for capturing dynamic info).

At the time the UE 602 executes the application to connect with the desired instance, the UE 602 performs the registration process with the gNB 604 and the AMF 606 at block 630. In 5G, UEs can demand the list of slices it needs for various applications. As part of the Registration request UE (for example, Mobile handset or a Laptop or any other device having WebEx application installed and connecting to a 5G network) sends the requested WebEx slices in the initial radio resource control (RRC) and non-access stratum (NAS) messages to 5G network.

In some cases, the gNB 604 (5G RAN) identifies the appropriate AMF 606 which supports all the requested slices and forwards the NAS message to that AMF 606. The AMF 606 verifies the requested slices with the subscription info of the UE 602 by verifying with UDM 610. If the requested slices are found, then the AMF 606 may compute the allowed slices list for the UE 602. The AMF 606 may also invoke the PCF 612 and retrieve the UE route selection policy (URSP) for UE.

The UE 602 may receive the URSP as part of the initial registration. The application executing on the UE 602 (e.g., Cisco Webex®) may request to update slice information for the protocol data unit (PDU) session 632 from the AF 616.

The AF 616 retrieves the latest updated slice information 634 from the UDSF 614 for application on the UE 602 and identifies the current slice to be used based on a timestamp. The AF 616 then requests the PCF 612 to send the UDSF update 636 with the slice information to be used for the PDU session of the application.

The PCF 612 transmits a verify access message 638 to the UDM 610 that verifies if the UE is entitled to use the requested slice. The PCF 612 modifies the URSP rules, where it provides a lowest rule precedence value for the network slice so that it will be selected for the application instance. The URSP will contain the rules for creating the PDU session for the application with the required slice and data network name (DNN) information. In the examples of a Cisco Webex® meeting, the URSP rule contains the Webex application ID and the allowed slices such as single-network slice selection assistance information (S-NSSAIs)) and DNNs for it. Accordingly, the UE 602 can choose the slice from the given S-NSSAIs and the corresponding DNN.

In some examples, the PCF 612 compares the slices and identifies the slice based on the lowest rule precedence value. The PCF 612 sends the modified URSP rules 640 to the UE 602. The UE 602 receives the modified URSP rules 640, selects the appropriate slice to establish the PDU session, and transmits a PDU establishment message 642 to the UPF 608 to finish PDU session establishment.

Figure 7:
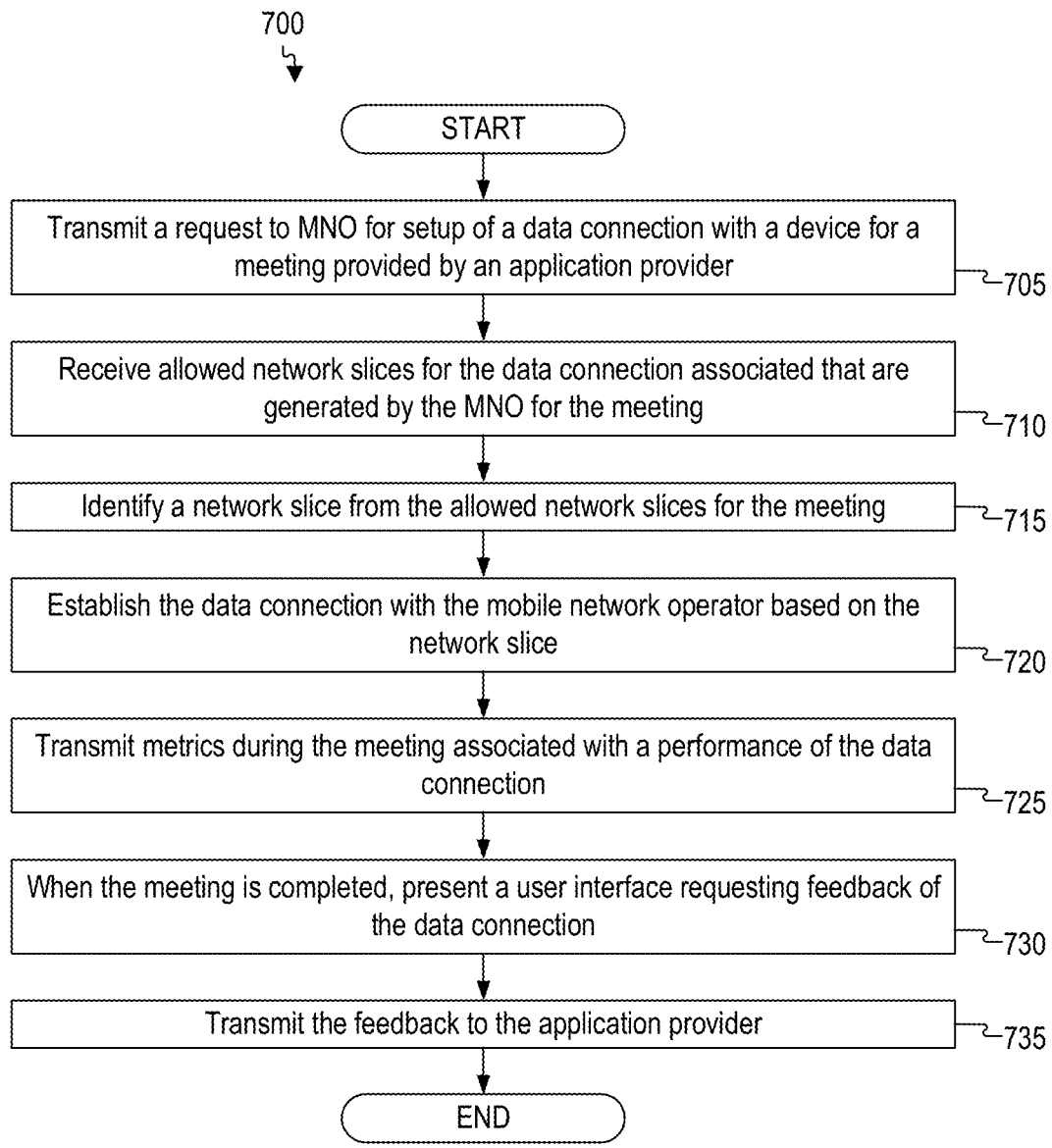
FIG. 7 illustrates a flowchart of a method of a user equipment (UE) for connecting to an instance of an application with an application-specific network slice according to an example of the instant disclosure.

FIG. 7 illustrates an example method 700 of a UE for connecting to an instance of an application with an application-specific network slice. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the UE (e.g., UE 602) may transmit a request to an MNO for setup of a data connection with a device for a meeting provided by an application provider at block 705. The request includes a role associated with the meeting.

The UE at block 710 may receive allowed network slices for the data connection associated that are generated by the MNO for the meeting. The MNO determines the allowed network slices provided to the device based on the role associated with the meeting. The role associated with the meeting is assigned during setup of the meeting or modification of the meeting with the application provider. The mobile network operator generates network slices based on different roles associated with the meeting.

At block 715, the UE may identify a network slice from the allowed network slices for the meeting. The network slice for the meeting satisfies requirements based on the network characteristics, the device characteristics, and the role associated with the meeting. In another example of block 715, the UE may determine network characteristics of the data connection to determine the suitable network slice. In some examples, the UE may determine device characteristics relevant to the meeting At block 720, the UE may establish the data connection with the mobile network operator based on the network slice. The mobile network operator reserves resources for the meeting based on an estimated location of the device. At block 725, the UE may transmit metrics during the meeting associated with performance of the data connection.

At block 730, when the meeting is completed, the UE may present a user interface requesting feedback of the data connection. When the meeting is associated with a group of meetings, the application provider modifies a recurring meeting information based on the metrics and the feedback. At block 735, the UE may transmit the feedback to the application provider.

Figure 8:
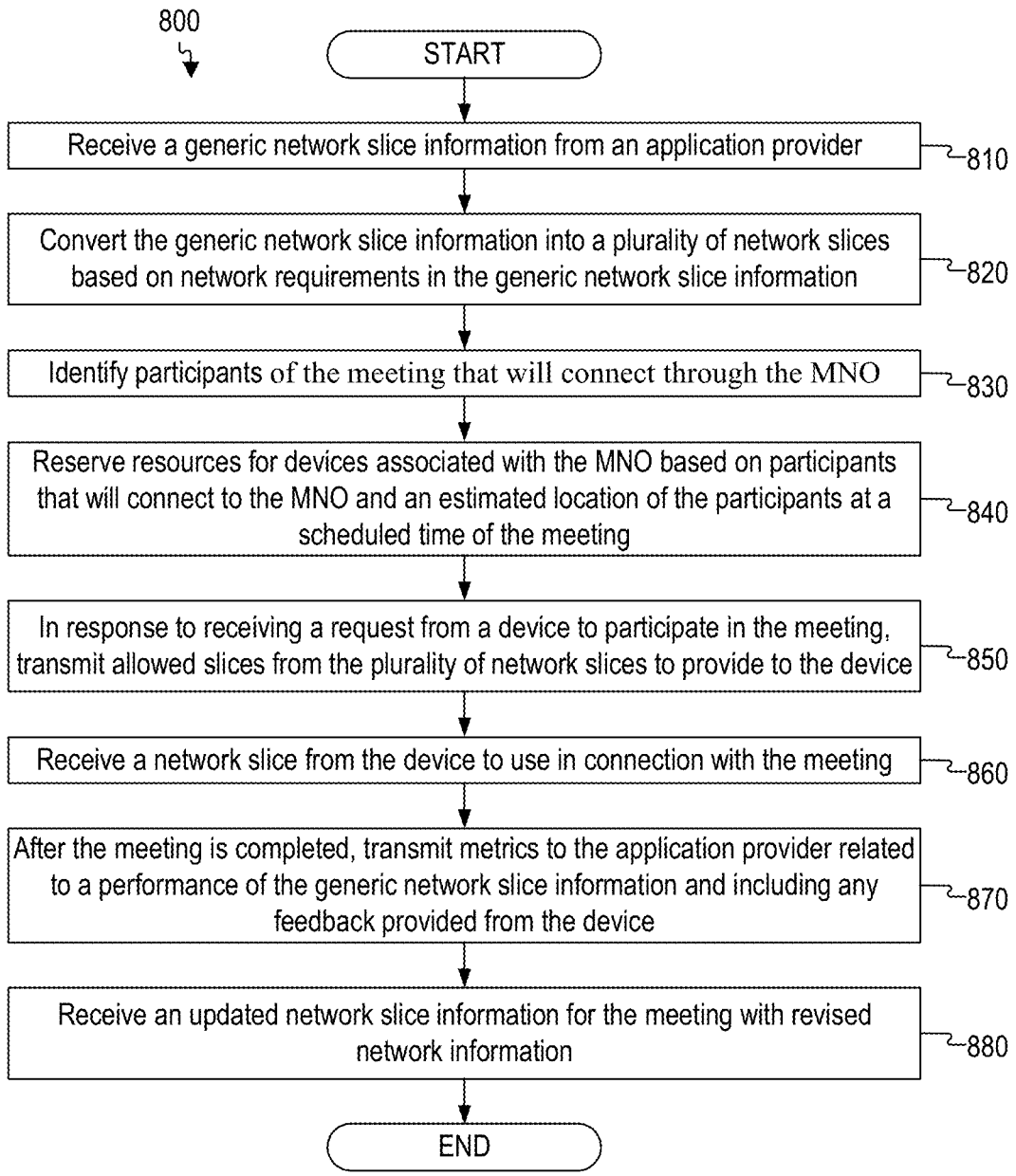
FIG. 8 illustrates a flowchart of a method of a mobile network operator (MNO) for providing application-specific network slices according to an example of the instant disclosure.

FIG. 8 illustrates an example method 800 of an MNO for providing application-specific network slices. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, the method 800 is performed by any suitable MNO network entity (e.g., AMF 606, UPF 608, UDM 610, PCF 612, UDSF 614, AF 616, etc.). At block 810, the MNO network entities may receive a generic network slice information from an application provider, the generic network slice information identifying slices for a meeting that will occur over a network of a mobile network operator (MNO. At block 820, the MNO network entities may convert the generic network slice information into a plurality of network slices based on network requirements in the generic network slice information.

At block 830 the MNO network entities may identify participants of the meeting that will connect through the MNO. The plurality of network slices are generated for the participants of the meeting that will connect through the MNO. At block 840, the MNO network entities may reserve resources for devices associated with the MNO based on participants that will connect to the MNO and an estimated location of the participants at a scheduled time of the meeting.

At block 850, in response to receiving a request from a device to participate in the may transmit allowed slices from the plurality of network slices to provide to the device. The request from the device includes a recommended network slice based on a participating role of the device. At block 860, the MNO network entities may receive a network slice from the device to use in connection with the meeting. The device selects the network slice based on device characteristics and a role associated with the device.

At block 870, after the meeting is completed, the MNO network entities may transmit metrics to the application provider related to a performance of the generic network slice information and including any feedback provided from the device. At block 880, the MNO network entities may receive an updated network slice information for the meeting with revised network information. The revised network information is updated based on the metrics and the feedback.

Figure 9:
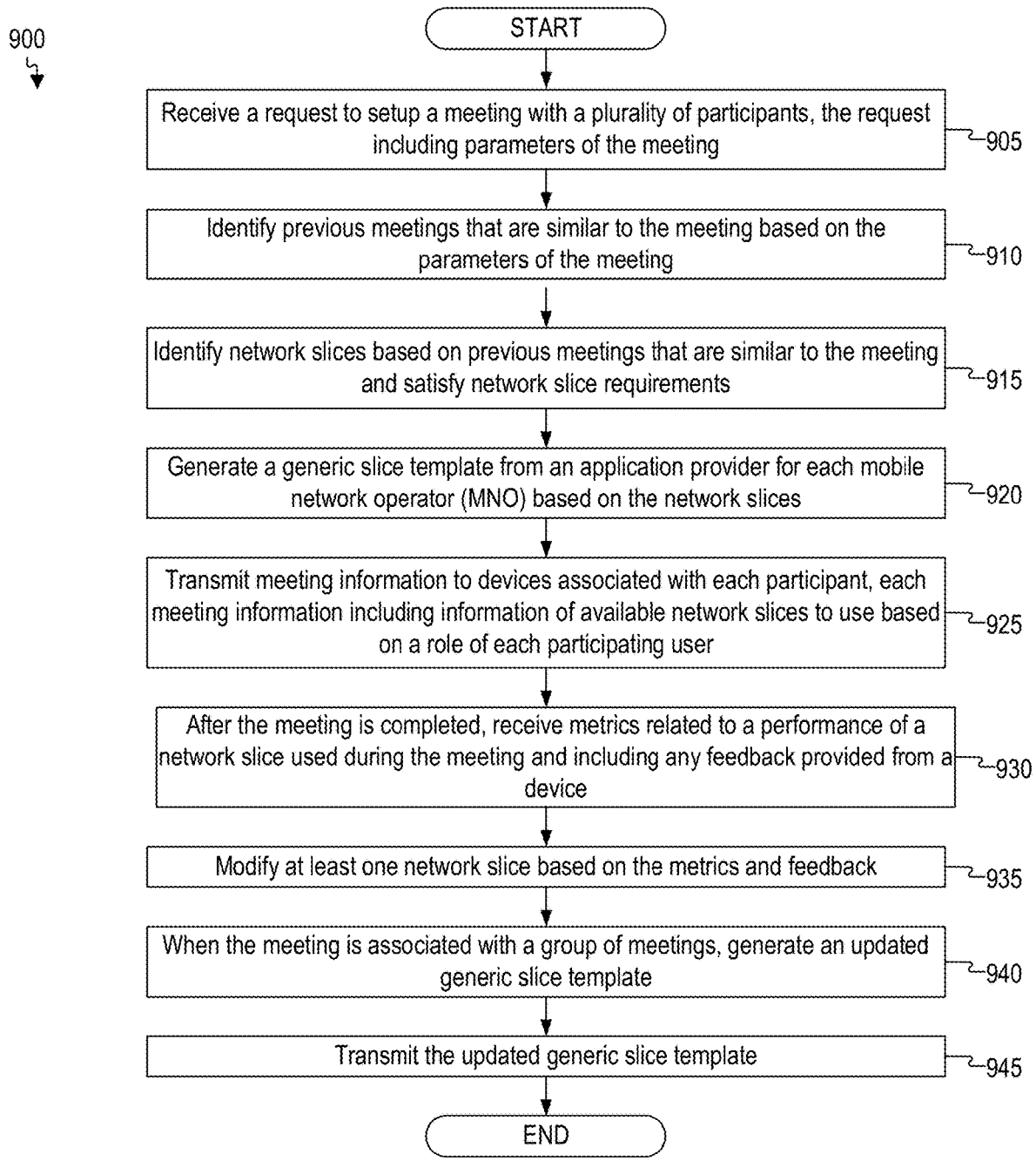
FIG. 9 illustrates a flowchart of a method of an application provider for creating application-specific network slices according to an example of the instant disclosure.
Figure 10:
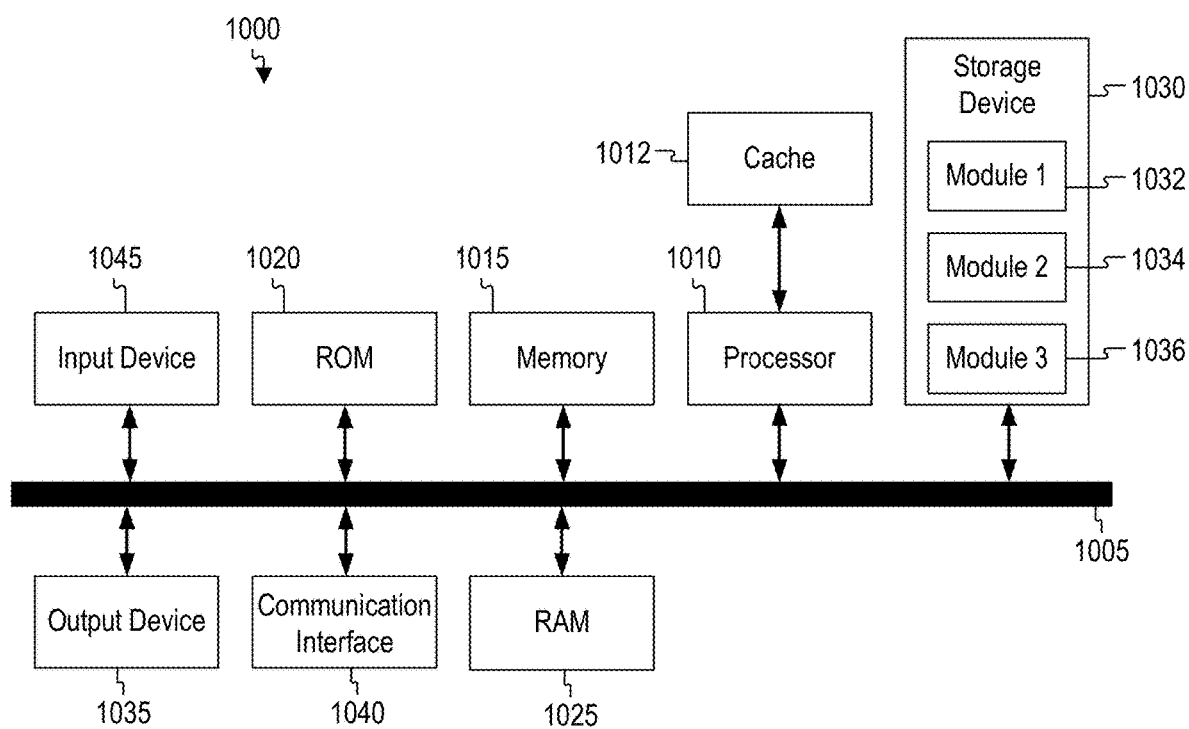
FIG. 10 illustrates an example of computing system according to an example of the instant disclosure.

FIG. 9 illustrates an example method 900 of an application provider for providing application-specific network slices. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method 900 is performed by an application provider (e.g., Cisco Webex®). At block 905. For example, the application provider may receive a request to setup a meeting with a plurality of participants, the request including parameters of the meeting. The parameters of the meeting include a quantity of participants, the network slice requirements, mobility information, scheduling information, recurrence information, and identification of different roles within the meeting.

At block 910, the application provider may identify previous meetings that are similar to the meeting based on the parameters of the meeting. At block 915, the application provider may identify network slices based on previous meetings that are similar to the meeting and satisfy network slice requirements.

At block 920, the application provider may generate a generic slice template from an application provider for each MNO based on the network slices.

At block 925, the application provider may transmit meeting information to devices associated with each participant, each meeting information including information of available network slices to use based on a role of each participating user.

At block 930, the application provider may after the meeting is completed, receive metrics related to a performance of a network slice used during the meeting and include any feedback provided from a device. At block 935, the application provider may modify at least one network slice stored by the application provider based on the feedback.

At block 940, when the meeting is associated with a group of meetings, the application provider may generate an updated generic slice template for at least one future meeting with revised network slices. At block 945, the application provider may transmit the updated generic slice template to each MNO.

FIG. 10 shows an example of computing system 1000, which can be for example any computing device that can be included in UE 602, gNB 604, AMF 606, UPF 608, UDM 610, PCF 612, UDSF 614, AF 616, NEF 618, and xAF 620, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU) such as a processor 1010 (e.g., a implemented in circuitry) and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, RAM, ROM, and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method comprising: transmitting a request to a MNO for setup of a data connection with a device for a meeting provided by an application provider; receiving allowed network slices for the data connection that are generated by the MNO for the meeting; identifying a network slice from the allowed network slices for the meeting based on one or more characteristics specific to the meeting; and establishing the data connection with the mobile network operator based on the network slice.

Aspect 2. The method of Aspect 1, wherein the request includes a role associated with the meeting.

Aspect 3. The method of any of Aspects 1 to 2, wherein identifying the network slice for the meeting based on the one or more characteristics specific to the meeting comprises: determining network characteristics of the data connection; and determining device characteristics relevant to the meeting, and wherein the network slice for the meeting satisfies requirements based on the network characteristics, the device characteristics, and the role associated with the meeting.

Aspect 4. The method of any of Aspects 1 to 3, wherein the mobile network operator determines the allowed network slices provided to the device based on the role associated with the meeting.

Aspect 5. The method of any of Aspects 1 to 4, wherein the role associated with the meeting is assigned during setup of the meeting or modification of the meeting with the application provider.

Aspect 6. The method of any of Aspects 1 to 5, further comprising: transmitting metrics during the meeting associated with a performance of the data connection.

Aspect 7. The method of any of Aspects 1 to 6, further comprising: when the meeting is completed, presenting a user interface requesting feedback of the data connection; and transmitting the feedback to the application provider.

Aspect 8. The method of any of Aspects 1 to 7, wherein, when the meeting is associated with a group of meetings, the application provider modifies a recurring meeting information based on the metrics and the feedback.

Aspect 9. The method of any of Aspects 1 to 8, wherein the mobile network operator reserves resources for the meeting based on an estimated location of the device.

Aspect 10. The method of any of Aspects 1 to 9, wherein the mobile network operator generates network slices based on different roles associated with the meeting.

Aspect 11. A method comprising: receiving a generic network slice information from an application provider, the generic network slice information identifying slices for a meeting that will occur over a network of a MNO; converting the generic network slice information into a plurality of network slices based on network requirements in the generic network slice information; in response to receiving a request from a device to participate in the meeting, transmitting allowed slices from the plurality of network slices to provide to the device; and receiving a network slice from the device to use in connection with the meeting, wherein the device selects the network slice based on device characteristics and a role associated with the device.

Aspect 12. The method of Aspect 11, wherein the request from the device includes a recommended network slice based on a participating role of the device.

Aspect 13. The method of any of Aspects 11 to 12, further comprising: after the meeting is completed, transmitting metrics to the application provider related to a performance of the generic network slice information and including any feedback provided from the device.

Aspect 14. The method of any of Aspects 11 to 13, further comprising: receiving an updated network slice information for the meeting with revised network information, wherein the revised network information is updated based on the metrics and the feedback.

Aspect 15. The method of any of Aspects 11 to 14, further comprising: reserving resources for devices associated with the MNO based on participants that will connect to the MNO and an estimated location of the participants at a scheduled time of the meeting.

Aspect 16. The method of any of Aspects 11 to 15, further comprising: identifying participants of the meeting that will connect through the MNO, wherein the plurality of network slices are generated for the participants of the meeting that will connect through the MNO.

Aspect 17. A method comprising: receiving a request to setup a meeting with a plurality of participants, the request including parameters of the meeting; identifying previous meetings that are similar to the meeting based on the parameters of the meeting; identifying network slices based on previous meetings that are similar to the meeting and satisfy network slice requirements; generating a generic slice template from an application provider for each MNO based on the network slices; and transmitting meeting information to devices associated with each participant, each meeting information including information of available network slices to use based on a role of each participating user.

Aspect 18. The method of Aspect 17, wherein the parameters of the meeting include a quantity of participants, the network slice requirements, mobility information, scheduling information, recurrence information, and identification of different roles within the meeting.

Aspect 19. The method of any of Aspects 17 to 18, further comprising: after the meeting is completed, receiving metrics related to a performance of a network slice used during the meeting and including any feedback provided from a device; and modifying at least one network slice stored by the application provider based on the feedback.

Aspect 20. The method of any of Aspects 17 to 19, further comprising: when the meeting is associated with a group of meetings, generating an updated generic slice template for at least one future meeting with revised network slices; and transmitting the updated generic slice template to each MNO.

Aspect 21: A device for participating in a meeting through an application provider includes a storage (implemented in circuitry) configured to store instructions and a processor. The processor configured to execute the instructions and cause the processor to: transmit a request to a MNO for setup of a data connection with a device for a meeting provided by an application provider; receive allowed network slices for the data connection that are generated by the MNO for the meeting; identify a network slice from the allowed network slices for the meeting based on one or more characteristics specific to the meeting; and establish the data connection with the mobile network operator based on the network slice.

Aspect 22: The device of Aspect 21, wherein the request includes a role associated with the meeting.

Aspect 23: The device of any of Aspects 21 to 22, wherein the processor is configured to execute the instructions and cause the processor to: determine network characteristics of the data connection; and determine device characteristics relevant to the meeting, and wherein the network slice for the meeting satisfies requirements based on the network characteristics, the device characteristics, and the role associated with the meeting.

Aspect 24: The device of any of Aspects 21 to 23, wherein the mobile network operator determines the allowed network slices provided to the device based on the role associated with the meeting.

Aspect 25: The device of any of Aspects 21 to 24, wherein the role associated with the meeting is assigned during setup of the meeting or modification of the meeting with the application provider.

Aspect 26: The device of any of Aspects 21 to 25, wherein the processor is configured to execute the instructions and cause the processor to: transmit metrics during the meeting associated with a performance of the data connection.

Aspect 27: The device of any of Aspects 21 to 26, wherein the processor is configured to execute the instructions and cause the processor to: when the meeting is completed, present a user interface requesting feedback of the data connection; and transmit the feedback to the application provider.

Aspect 28: The device of any of Aspects 21 to 27, wherein the processor is configured to execute the instructions and cause the processor to: when the meeting is associated with a group of meetings, present a user interface requesting feedback of the data connection; and transmit the feedback to the application provider.

Aspect 29: The device of any of Aspects 21 to 28, wherein the mobile network operator reserves resources for the meeting based on an estimated location of the device.

Aspect 30: The device of any of Aspects 21 to 29, wherein the mobile network operator generates network slices based on different roles associated with the meeting.

Aspect 31: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: transmit a request to a MNO for setup of a data connection with a device for a meeting provided by an application provider; receive allowed network slices for the data connection that are generated by the MNO for the meeting; identify a network slice from the allowed network slices for the meeting based on one or more characteristics specific to the meeting; and establish the data connection with the mobile network operator based on the network slice.

Aspect 32: The computer readable medium of Aspect 31, wherein the request includes a role associated with the meeting.

Aspect 33: The computer readable medium of any of Aspects 31 to 32, wherein the processor is configured to execute the computer readable medium and cause the processor to: determine network characteristics of the data connection; and determine device characteristics relevant to the meeting, and wherein the network slice for the meeting satisfies requirements based on the network characteristics, the device characteristics, and the role associated with the meeting.

Aspect 34: The computer readable medium of any of Aspects 31 to 33, wherein the mobile network operator determines the allowed network slices provided to the device based on the role associated with the meeting.

Aspect 35: The computer readable medium of any of Aspects 31 to 34, wherein the role associated with the meeting is assigned during setup of the meeting or modification of the meeting with the application provider.

Aspect 36: The computer readable medium of any of Aspects 31 to 35, wherein the processor is configured to execute the computer readable medium and cause the processor to: transmit metrics during the meeting associated with a performance of the data connection.

Aspect 37: The computer readable medium of any of Aspects 31 to 36, wherein the processor is configured to execute the computer readable medium and cause the processor to: when the meeting is completed, present a user interface requesting feedback of the data connection; and transmit the feedback to the application provider.

Aspect 38: The computer readable medium of any of Aspects 31 to 37, wherein the processor is configured to execute the computer readable medium and cause the processor to: when the meeting is associated with a group of meetings, present a user interface requesting feedback of the data connection; and transmit the feedback to the application provider.

Aspect 39: The computer readable medium of any of Aspects 31 to 38, wherein the mobile network operator reserves resources for the meeting based on an estimated location of the device.

Aspect 40: The computer readable medium of any of Aspects 31 to 39, wherein the mobile network operator generates network slices based on different roles associated with the meeting.

Aspect 41: A system for configuring a meeting through an application provider includes a storage (implemented in circuitry) configured to store instructions and a processor. The processor configured to execute the instructions and cause the processor to: receive a generic network slice information from an application provider, the generic network slice information identifying slices for a meeting that will occur over a network of a MNO; converting the generic network slice information into a plurality of network slices based on network requirements in the generic network slice information; in response to receiving a request from a device to participate in the meeting, transmit allowed slices from the plurality of network slices to provide to the device; and receive a network slice from the device to use in connection with the meeting, wherein the device selects the network slice based on device characteristics and a role associated with the device.

Aspect 42: The system of Aspect 41, wherein the request from the device includes a recommended network slice based on a participating role of the device.

Aspect 43: The system of any of Aspects 41 to 42, wherein the processor is configured to execute the computer readable medium and cause the processor to, after the meeting is completed, transmit metrics to the application provider related to a performance of the generic network slice information and including any feedback provided from the device.

Aspect 44: The system of any of Aspects 41 to 43, wherein receiving an updated network slice information for the meeting with revised network information, wherein the revised network information is updated based on the metrics and the feedback.

Aspect 45: The system of any of Aspects 41 to 44, wherein the processor is configured to execute the instructions and cause the processor to: reserve resources for devices associated with the MNO based on participants that will connect to the MNO and an estimated location of the participants at a scheduled time of the meeting.

Aspect 46: The system of any of Aspects 41 to 45, wherein the processor is configured to execute the instructions and cause the processor to: identify participants of the meeting that will connect through the MNO, wherein the plurality of network slices are generated for the participants of the meeting that will connect through the MNO.

Aspect 47: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive a generic network slice information from an application provider, the generic network slice information identifying slices for a meeting that will occur over a network of a MNO; converting the generic network slice information into a plurality of network slices based on network requirements in the generic network slice information; in response to receiving a request from a device to participate in the meeting, transmit allowed slices from the plurality of network slices to provide to the device; and receive a network slice from the device to use in connection with the meeting, wherein the device selects the network slice based on device characteristics and a role associated with the device.

Aspect 48: The computer readable medium of Aspect 47, wherein the request from the device includes a recommended network slice based on a participating role of the device.

Aspect 49: The computer readable medium of any of Aspects 47 to 48, wherein the processor is configured to execute the computer readable medium and cause the processor to after the meeting is completed, transmit metrics to the application provider related to a performance of the generic network slice information and including any feedback provided from the device.

Aspect 50: The computer readable medium of any of Aspects 47 to 49, wherein receiving an updated network slice information for the meeting with revised network information, wherein the revised network information is updated based on the metrics and the feedback.

Aspect 51: The computer readable medium of any of Aspects 47 to 50, wherein the processor is configured to execute the computer readable medium and cause the processor to: reserve resources for devices associated with the MNO based on participants that will connect to the MNO and an estimated location of the participants at a scheduled time of the meeting.

Aspect 52: The computer readable medium of any of Aspects 47 to 51, wherein the processor is configured to execute the computer readable medium and cause the processor to: identify participants of the meeting that will connect through the MNO, wherein the plurality of network slices are generated for the participants of the meeting that will connect through the MNO.

Aspect 53: A wireless communication system for configuring a meeting through an application provider includes a storage (implemented in circuitry) configured to store instructions and a processor. The processor configured to execute the instructions and cause the processor to: receive a request to setup a meeting with a plurality of participants, the request including parameters of the meeting; identify previous meetings that are similar to the meeting based on the parameters of the meeting; identify network slices based on previous meetings that are similar to the meeting and satisfy network slice requirements; generate a generic slice template from an application provider for each MNO based on the network slices; and transmit meeting information to devices associated with each participant, each meeting information including information of available network slices to use based on a role of each participating user.

Aspect 54: The wireless communication system of Aspect 53, wherein the parameters of the meeting include a quantity of participants, the network slice requirements, mobility information, scheduling information, recurrence information, and identification of different roles within the meeting.

Aspect 55: The wireless communication system of any of Aspects 53 to 54, wherein the processor is configured to execute the computer readable medium and cause the processor to: after the meeting is completed, receive metrics related to a performance of a network slice used during the meeting and including any feedback provided from a device; and modify at least one network slice stored by the application provider based on the feedback.

Aspect 56: The wireless communication system of any of Aspects 53 to 55, wherein the processor is configured to execute the instructions and cause the processor to: when the meeting is associated with a group of meetings, generate an updated generic slice template for at least one future meeting with revised network slices; and transmit the updated generic slice template to each MNO.

Aspect 57: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive a request to setup a meeting with a plurality of participants, the request including parameters of the meeting; identify previous meetings that are similar to the meeting based on the parameters of the meeting; identify network slices based on previous meetings that are similar to the meeting and satisfy network slice requirements; generate a generic slice template from an application provider for each MNO based on the network slices; and transmit meeting information to devices associated with each participant, each meeting information including information of available network slices to use based on a role of each participating user.

Aspect 58: The computer readable medium of Aspect 57, wherein the parameters of the meeting include a quantity of participants, the network slice requirements, mobility information, scheduling information, recurrence information, and identification of different roles within the meeting.

Aspect 59: The computer readable medium of any of Aspects 57 to 58, wherein the processor is configured to execute the computer readable medium and cause the processor to: after the meeting is completed, receive metrics related to a performance of a network slice used during the meeting and including any feedback provided from a device; and modify at least one network slice stored by the application provider based on the feedback.

Aspect 60: The computer readable medium of any of Aspects 57 to 59, wherein the processor is configured to execute the computer readable medium and cause the processor to: when the meeting is associated with a group of meetings, generate an updated generic slice template for at least one future meeting with revised network slices; and transmit the updated generic slice template to each MNO.

What is claimed is:

1. A method comprising:
    transmitting, by a user equipment and to a mobile network operator (MNO), a request for setup of a data connection with a device for a meeting provided by an application provider;
    receiving, by the user equipment, allowed network slices for the data connection that are generated by the MNO for the meeting;
    identifying, by the user equipment, a network slice from the allowed network slices for the meeting based on one or more characteristics specific to the meeting;
    establishing, by the user equipment, the data connection with the mobile network operator based on the network slice;
    upon completion of the meeting, presenting, on the user equipment, a user interface requesting feedback on the data connection; and
    transmitting the feedback to the application provider.

2. The method of claim 1, wherein the request includes a role associated with the meeting.

3. The method of claim 2, wherein identifying the network slice for the meeting based on the one or more characteristics specific to the meeting comprises:
    determining network characteristics of the data connection; and
    determining device characteristics relevant to the meeting, and
    wherein the network slice for the meeting satisfies requirements based on the network characteristics, the device characteristics, and the role associated with the meeting.

4. The method of claim 3, wherein the mobile network operator determines the allowed network slices provided to the device based on the role associated with the meeting.

5. The method of claim 4, wherein the role associated with the meeting is assigned during setup of the meeting or modification of the meeting with the application provider.

6. The method of claim 1, further comprising:
transmitting, to the application provider and during the meeting, metrics associated with a performance of the data connection.

7. The method of claim 1 wherein, when the meeting is associated with a group of meetings, the application provider modifies a recurring meeting information based on the metrics and the feedback.

8. A device for participating in a meeting through an application provider, comprising:
one or more memories configured to store computer-readable instructions; and
one or more processors configured to execute the computer-readable instructions to:
transmit a request to a mobile network operator (MNO) for setup of a data connection with a device for a meeting provided by an application provider;
receive allowed network slices for the data connection that are generated by the MNO for the meeting;
identify a network slice from the allowed network slices for the meeting based on one or more characteristics specific to the meeting;
establish the data connection with the mobile network operator based on the network slice;
upon completion of the meeting, present, on the device, a user interface requesting feedback on the data connection; and
transmit the feedback to the application provider.

9. The device of claim 8, wherein the request includes a role associated with the meeting.

10. The device of claim 9, wherein the processor is configured to execute the instructions and cause the processor to:
determine network characteristics of the data connection; and
determine device characteristics relevant to the meeting, and
wherein the network slice for the meeting satisfies requirements based on the network characteristics, the device characteristics, and the role associated with the meeting.

11. The device of claim 10, wherein the mobile network operator determines the allowed network slices provided to the device based on the role associated with the meeting.

12. The device of claim 11, wherein the role associated with the meeting is assigned during setup of the meeting or modification of the meeting with the application provider.

13. The device of claim 8, wherein the processor is configured to execute the instructions and cause the processor to:
transmit, to the application provider and during the meeting, metrics associated with a performance of the data connection.

14. The device of claim 8, wherein, when the meeting is associated with a group of meeting, the application provider modifies a recurring meeting information based on the metrics and the feedback.

15. One or more non-transitory computer readable media comprising computer-readable instructions, which when executed by one or more processors of a computing system, cause the computing system to:
transmit a request to a mobile network operator (MNO) for setup of a data connection with a device for a meeting provided by an application provider;
receive allowed network slices for the data connection that are generated by the MNO for the meeting;
identify a network slice from the allowed network slices for the meeting based on one or more characteristics specific to the meeting;
establish the data connection with the mobile network operator based on the network slice;
upon completion of the meeting, present, on the device, a user interface requesting feedback on the data connection; and
transmit the feedback to the application provider.

16. The one or more non-transitory computer readable media of claim 15, the request includes a role associated with the meeting.

17. The one or more non-transitory computer readable media of claim 16, wherein the computer readable media further comprises instructions that, when executed by the computing system, cause the computing system to:
determine network characteristics of the data connection; and
determine device characteristics relevant to the meeting, and
wherein the network slice for the meeting satisfies requirements based on the network characteristics, the device characteristics, and the role associated with the meeting.

18. The one or more non-transitory computer readable media of claim 17, the mobile network operator determines the allowed network slices provided to the device based on the role associated with the meeting.

* * * * *